(12) United States Patent
Milner

(10) Patent No.: US 7,085,707 B2
(45) Date of Patent: Aug. 1, 2006

(54) FOREIGN LANGUAGE TEACHING TOOL

(75) Inventor: Edward Casteel Milner, Dallas, TX (US)

(73) Assignee: International Business Machines Corporation, Armonk, NY (US)

(*) Notice: Subject to any disclaimer, the term of this patent is extended or adjusted under 35 U.S.C. 154(b) by 792 days.

(21) Appl. No.: 10/132,401

(22) Filed: Apr. 25, 2002

(65) Prior Publication Data

US 2003/0203343 A1 Oct. 30, 2003

(51) Int. Cl.
*G06F 17/28* (2006.01)
*G06F 17/20* (2006.01)

(52) U.S. Cl. .................. 704/5; 704/3; 704/4; 704/2

(58) Field of Classification Search ............... 434/157; 364/419; 395/752; 704/2, 4, 6, 7, 3, 5
See application file for complete search history.

(56) References Cited

U.S. PATENT DOCUMENTS

| | | | | |
|---|---|---|---|---|
| 4,953,088 | A | * | 8/1990 | Suzuki et al. .................. 704/3 |
| 5,486,111 | A | | 1/1996 | Watkins ....................... 434/157 |
| 5,546,304 | A | | 8/1996 | Marschner et al. .... 364/419.04 |
| 5,957,693 | A | | 9/1999 | Panec ......................... 434/178 |
| 6,002,997 | A | | 12/1999 | Tou ............................... 704/2 |
| 6,139,201 | A | * | 10/2000 | Carbonell et al. ............. 704/2 |

(Continued)

OTHER PUBLICATIONS

Kubota et al., "Development of a Compact Electronic Word Translator", 1991, Journal of the Horological Institute of Japan, No. 138, pp. 1-14.*

*Primary Examiner*—Tālivaldis Ivars Šmits
*Assistant Examiner*—Eric Yen
(74) *Attorney, Agent, or Firm*—David A. Mims, Jr.; Rudolf D. Siegesmund

(57) ABSTRACT

The present invention, foreign language teaching tool (FLTT), is a language translation tool that slowly introduces the student to different words in the foreign language while the student is reading a familiar text. The preferred embodiment of FLTT is on an e-book, but FLTT can be adapted to printed hard-copy texts. FLTT starts with an original text in the student's native language and analyzes and translates the original text using a primary translation process. In the primary translation process, the original text is broken down into different grammatical units and then translated using a commercial computer translation package. A bilingual literature specialist then reviews the translated text and makes any necessary corrections in order to preserve the literary quality of the original text. Products of the primary translation process are an electronic copy of the original text, an electronic copy of the translated text, a correlation index showing a word-by-word and sentence-by-sentence correlation of the two texts, and grammatical unit index showing the grammatical unit breakdown of the two texts. In the secondary translation process, the foreign and original texts and the correlation and grammatical unit indices are downloaded to an e-book. The student specifies the order, rate and frequency of introduction of foreign grammatical units. The secondary translation process uses these criteria to create a partially translated text, in which foreign words are used sparingly at first, but the amount and frequency of the foreign words increases throughout the course of the book. The reader is able to easily identify the words as they are used in the context of the reader's native language. Furthermore, the reader is previously familiar with the storyline as the invention uses a text which is available to the student in his/her native language. Alternative embodiments are disclosed including a printed version of the present invention.

25 Claims, 7 Drawing Sheets

U.S. PATENT DOCUMENTS

| | | | |
|---|---|---|---|
| 6,305,942 B1 | 10/2001 | Block et al. | 434/156 |
| 6,393,389 B1 * | 5/2002 | Chanod et al. | 704/7 |
| 6,438,515 B1 * | 8/2002 | Crawford et al. | 704/5 |
| 2002/0091509 A1 * | 7/2002 | Zoarez et al. | 704/6 |
| 2003/0040899 A1 * | 2/2003 | Ogilvie | 704/2 |
| 2003/0083860 A1 * | 5/2003 | Abir | 704/7 |

* cited by examiner

702 — The fat boy looked at a green book.
704 — The fat boy looked at <u>un</u> green book.
706 — <u>El</u> fat boy looked at un green book.
708 — El fat <u>chico</u> looked at un green book.
710 — El <u>chico gordo</u> looked at un green book.
712 — El chico gordo <u>miró</u> at un green book.
714 — El chico gordo miró <u>a</u> un green book.
716 — El chico gordo miró a un green <u>libro</u>.
718 — El chico gordo miró a un <u>libro verde</u>.

The Old Sea Dog at the 'Admiral Benbow'

SQUIRE TRELAWNEY, DR. LIVESEY, and the rest of these gentlemen having asked me to write down the whole particulars about Treasure Island, from the beginning to the end, keeping nothing back but the bearings of the island, and that only because there is still treasure not yet lifted. I take up my pen in the year of grace 17--, and go back to the time when my father kept the 'Admiral Benbow' inn, and the brown old seaman, with the sabre cut, first took up his lodging under our roof.

I remember him as if it were yesterday, as he came plodding to the inn door, his sea-chest following behind him in a hand-barrow; a tall, strong heavy, nut-brown man; his tarry pigtail falling over the shoulders of his soiled blue coat; his hands ragged and scarred, with black, broken nails; and the the sabre cut across one cheek, a dirty, livid white. I remember him looking round the cove and whistling to himself as he did so, and then breaking out in that old sea-song that he sang so often afterwards:

'Fifteen men on the dead man's chest-
800        Yo-ho-ho, and a bottle of rum!'

*Fig. 8*

El Old Sea Dog at el 'Admiral Benbow'

SQUIRE TRELAWNEY, DR. LIVESEY, and el rest of these gentlemen having asked me to write down el whole particulars about Treasure Island, from el beginning to el end, keeping nothing back but el bearings of el island, and that only because there is still treasure not yet lifted. I take up my pen in el year of grace 17--, and go back to el time when my father kept el 'Admiral Benbow' Inn, and el brown old seaman, with el sabre cut, first took up his lodging under our roof.

I remember him as if it were yesterday, as he came plodding to la inn door, his sea-chest following behind him in a hand-barrow; a tall, strong heavy, nut-brown man; his tarry pigtail falling over el shoulders of his soiled blue coat; his hands ragged and scarred, with black, broken nails; and the el sabre cut across one cheek, a dirty, livid white. I remember him looking round el cove and whistling to himself as he did so, and then breaking out in that old sea-song that he sang so often afterwards:

'Fifteen men on el dead man's chest-
__900__      Yo-ho-ho, and a bottle of rum!'

*Fig. 9*

FOREIGN LANGUAGE TEACHING TOOL

FIELD OF THE INVENTION

The present invention relates to tools and teaching methods used to help students learn a foreign language.

BACKGROUND OF THE INVENTION

The problem of understanding a foreign language is not a new problem by any means. For centuries mankind has struggled with the problem of learning to read, write, and speak foreign languages. Over the years, many different theories have been set forth on what the most effective method is to teach a foreign language to someone who has no basis or underlying knowledge of the foreign language. One popular theory is to associate the unfamiliar foreign word with a familiar object or context. For example, in the sentence "I went to the library, checked out a libro and began to read" the reader associates the word "libro" with a book through the context of the sentence instead of trying to remember that "libro" means "book" in Spanish. Many foreign language teachers believe that this is one of the better methods of teaching a foreign language to a new student.

With the advent of computers, many different types of language translation software programs have been invented. However, most of these translation programs are not effective educational tools because they translate the entire text of a sentence or paragraph automatically and present the student with the completely translated sentence or paragraph. The student does not gain any knowledge or understanding about the vocabulary or grammatical rules of the foreign language by reading a completely translated sentence or paragraph in the foreign language. To alleviate this problem and improve the foreign language teaching process, many different methods have been disclosed over the years. An improved translation method was disclosed in U.S. Pat. No. 5,486,111 (the '111 patent) entitled "Foreign Language Teaching Aid and Method." The '111 patent discloses a method of placing the two sentences (native and foreign) next to each other and highlighting certain words and phrases that are translations of each other. While the '111 patent is a useful tool, a need still exists for a more basic method of teaching a foreign language to a student who is unfamiliar with the foreign language.

In recent years, electronic books or e-books have become the newest supplement to teaching aids. An e-book is a book that is stored on a small, handheld computing device with a large LCD screen. The student can read through the book in much the same manner as he or she would read through a printed book. E-books have the additional benefit of allowing definitions, annotations, or commentary to be attached or otherwise associated with a word or page in the e-book thorough a hyperlink. This is useful because the definition, annotation, or commentary is still accessible but does not clutter the page in the e-book. A foreign language teaching tool that utilized e-book technology would represent a significant advance in foreign language teaching aids.

Furthermore, students are more motivated to learn the foreign language if they are able to learn the foreign language in a context in which they have an interest, such as literature. Therefore, a need exists for a method of teaching a foreign language to a student which allows the student to learn the foreign language in the context of literature preferred by the student. Moreover, a need exists for an apparatus that will allow the student to customize the translation process of the literature and change the order, rate, and frequency of translated words.

Therefore, a need exists for a foreign language teaching tool which will allow the student to recognize the meaning of newly introduced foreign words by their context in the sentence. There also exists a need for a foreign language teaching aid in the form of an e-book. Additionally, a need exists for a foreign language teaching tool which will be interesting to the student. Furthermore, a need exists for a foreign language teaching aid apparatus and method that will allow the student to customize the teaching style to his/her learning pace.

SUMMARY OF THE INVENTION

The present invention, foreign language teaching tool (FLTT), is a language translation tool that slowly introduces the student to different words in the foreign language while the student is reading a familiar text. The preferred embodiment of FLTT is on an e-book, but FLTT can be adapted to printed hard-copy texts. FLTT starts with an original text in the student's native language and analyzes and translates the original text using a primary translation process. In the primary translation process, the original text is broken down into different grammatical units and then translated using a commercial computer translation package. A bilingual literature specialist then reviews the translated text and makes any necessary corrections in order to preserve the literary quality of the original text. Products of the primary translation process are an electronic copy of the original text, an electronic copy of the translated text, a correlation index showing a word-by-word and sentence-by-sentence correlation of the two texts, and grammatical unit index showing the grammatical unit breakdown of the two texts.

In the secondary translation process, the foreign and original texts and the correlation and grammatical unit indices are downloaded to an e-book. The student specifies the order, rate and frequency of introduction of foreign grammatical units. The secondary translation process uses these criteria to create a partially translated text, in which foreign words are used sparingly at first, but the amount and frequency of the foreign words increases throughout the course of the book. The reader is able to easily identify the words as they are used in the context of the reader's native language. Furthermore, the reader is previously familiar with the storyline as the invention uses a text which is available to the student in his/her native language. Alternative embodiments are disclosed including a printed version of the present invention.

BRIEF DESCRIPTION OF THE DRAWINGS

FIG. 8 is an example of a page of the original text.

FIG. 9 is an example of a page of the partially translated text.

DETAILED DESCRIPTION OF THE PREFERRED EMBODIMENT

Figure 1:
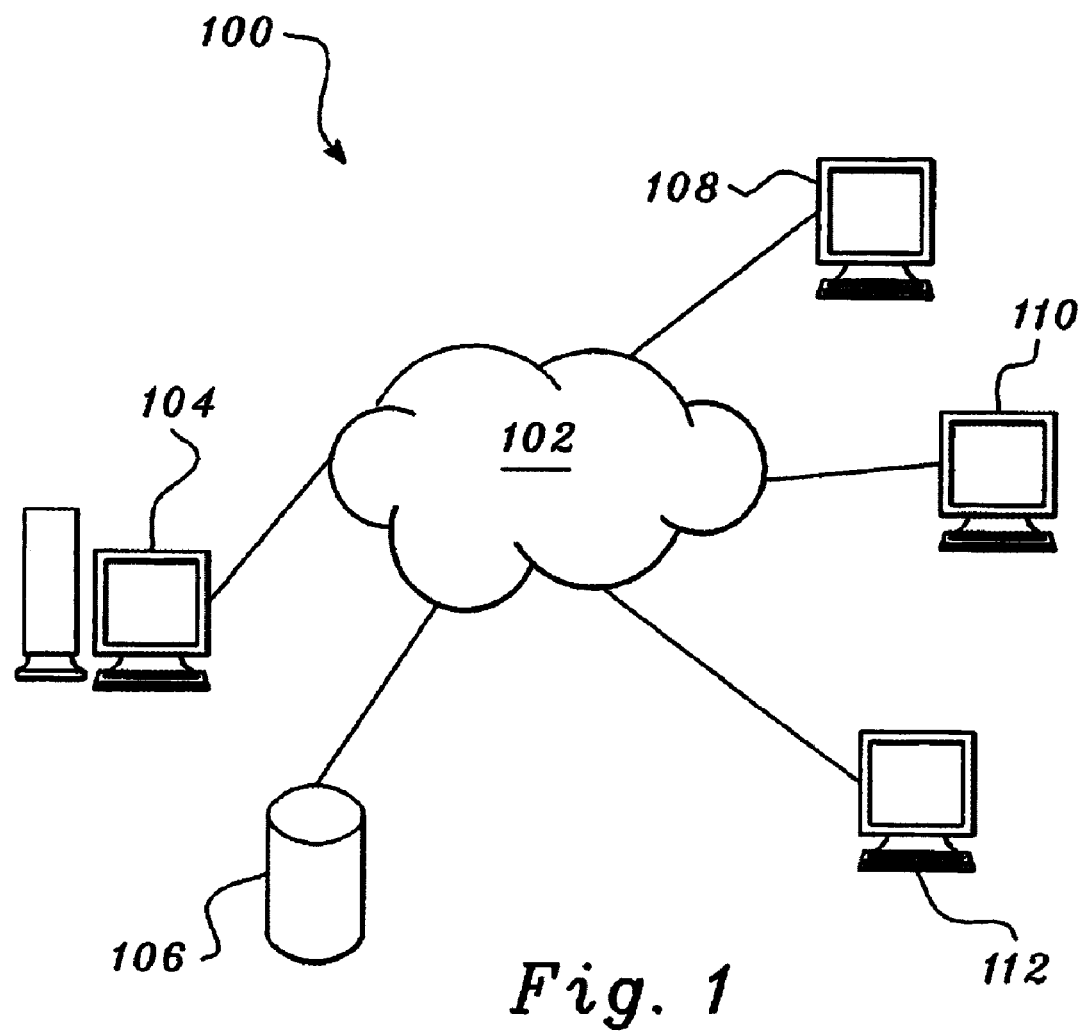
FIG. 1 is an illustration of a distributed data network which interacts with the e-book.

As used herein, the term "student" means anyone who desires to learn a foreign language. As used herein, the term "native language" means the language that the student is normally accustomed to reading, writing, and/or speaking. As used herein, the term "foreign language" means the language that the student is unfamiliar with and desires to learn. In the preferred embodiment, the native language is English and the foreign language is Spanish. However, the native and foreign languages can be any languages as defined by those skilled in the art. As used herein, the term "original text" means any written text, spoken words, or combination thereof that is in the native language of the student. As used herein, the term "translated text" means an equivalent of the original text which is translated into the foreign language. As used herein, the term "partially translated text" means the hybrid original/translated text that is produced by the foreign language teaching tool described herein. The partially translated text is the result of imposing the grammatical unit preferences upon the original and translated text, which normally produces a text that is mostly original text in the beginning, gradually incorporates an increasing amount of foreign words, and ends completely in the foreign language. However, the partially translated text may be altered such that it begins in a combination of native language and foreign language words or ends in a combination of native language and foreign language words. As used herein, the terms "foreign" and "translated" are used interchangeably when referring to words, phrases, audio, or texts. As used herein, the "order" of foreign words means the sequence in which the foreign grammatical units are introduced to the student in reference to other grammatical units. As used here, the term "rate" of foreign words means the number of pages that must pass from the beginning of the text until a specific grammatical unit is introduced to the student. As used here, the term "frequency" of foreign words refers to the total number of times a foreign grammatical unit can be introduced in a single sentence, paragraph, or page. FIG. 1 depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communication links between the various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to a network 102. Clients 108, 110, and 112 may be, for example, personal computers or network computers.

For purposes of this application, a network computer is any computer, coupled to a network, which receives a program or other application from another computer coupled to the network. In the depicted example, server 104 provides Web based applications to clients 108, 110, and 112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as, an intranet, a local area network (LAN), or a wide area network (WAN).

Figure 2:
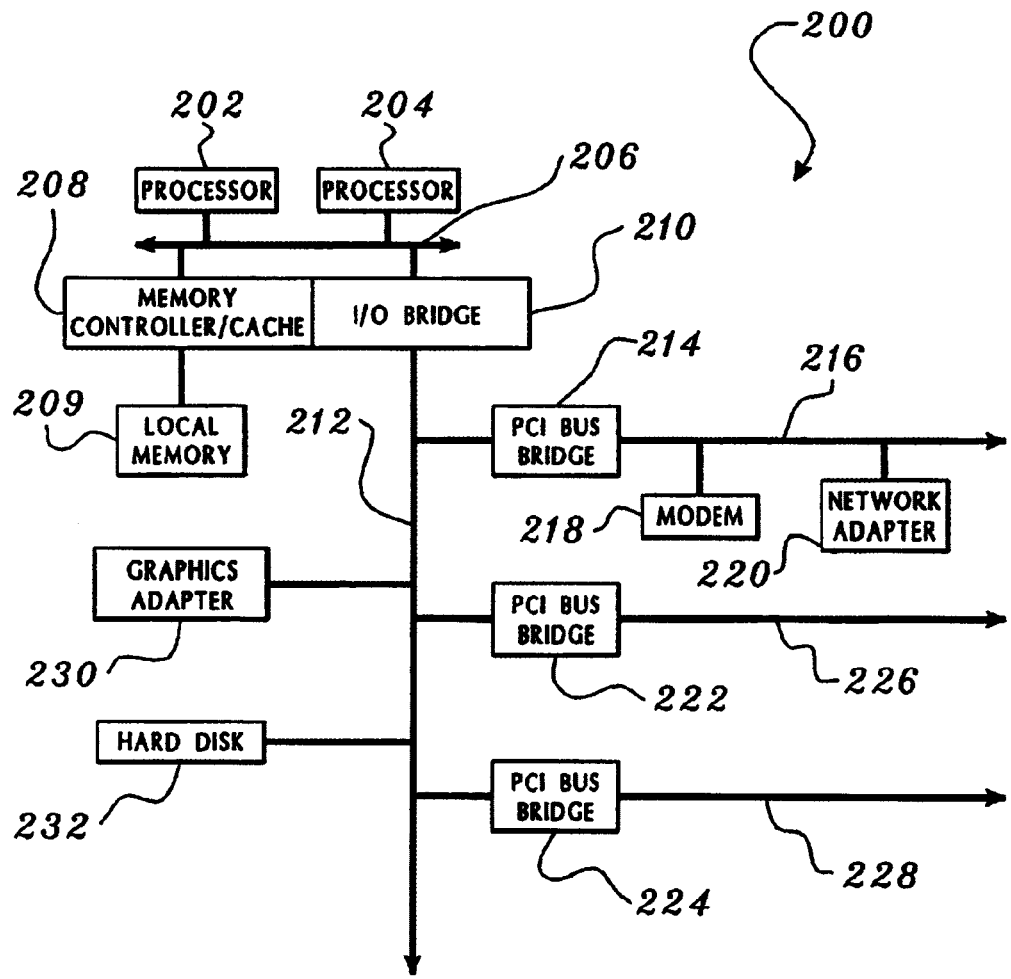
FIG. 2 is an illustration of a data processing system contained within the e-book.

Referring to FIG. 2, a block diagram depicts a data processing system, which may be implemented as a server, such as server 104 in FIG. 1 in accordance with the present invention. Data processing system 200 may be a symmetric multiprocessor (SMP) system including a plurality of processors such as first processor 202 and second processor 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to first PCI local bus 216. Modem 218 may be connected to first PCI local bus 216. Typical PCI bus implementations will support four PCI expansion slots or add-in connectors. Communications links to clients 108, 110 and 112 in FIG. 1 may be provided through modem 218 and network adapter 220 connected to first PCI local bus 216 through add-in boards. Additional PCI bus bridges such as second PCI bus bridge 222 and third PCI bus bridge 224 provide interfaces for additional PCI local buses such as second PCI local bus 226 and third PCI local bus 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as an optical disk drive and the like also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
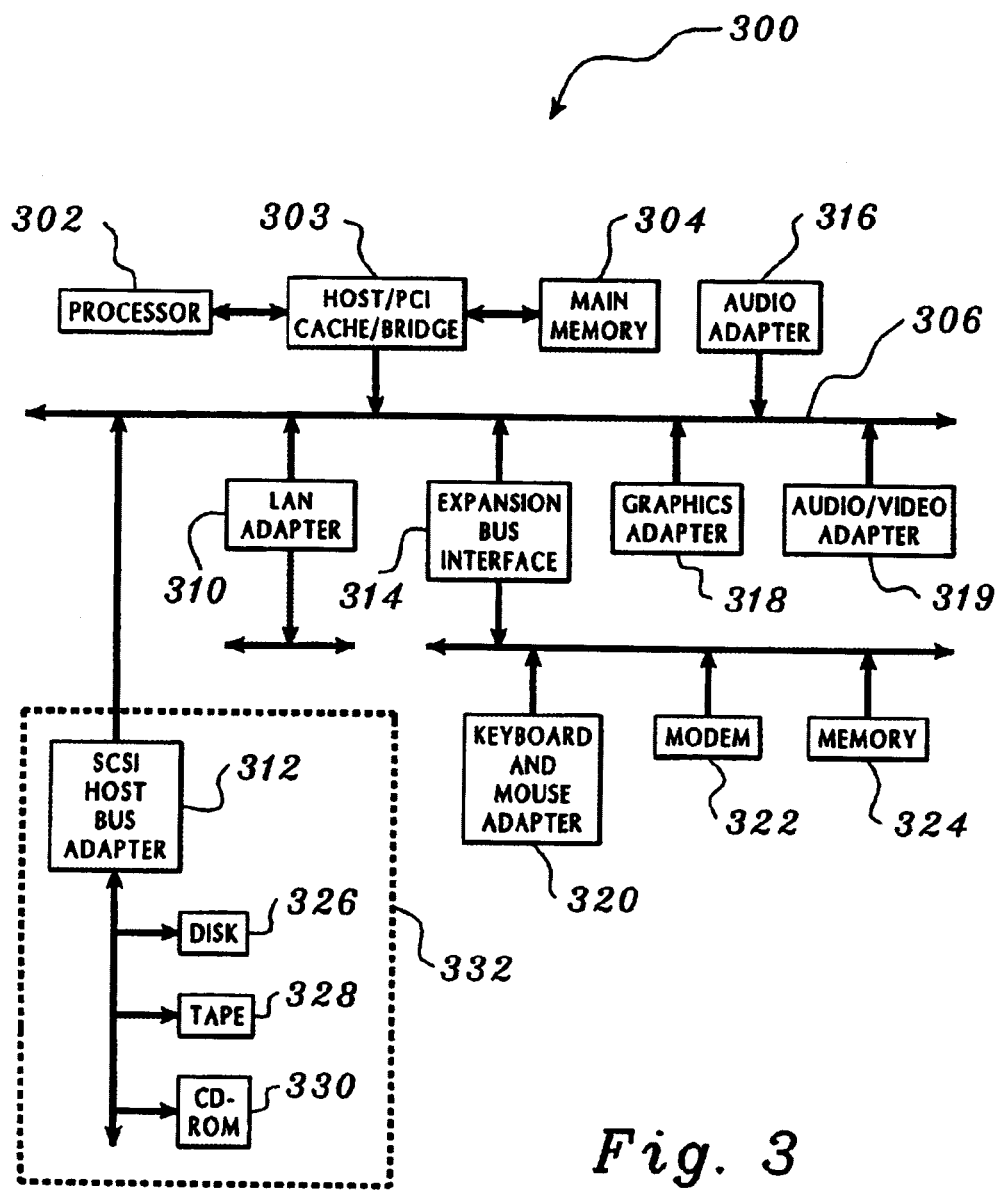
FIG. 3 is an illustration of a data processing system contained within the e-book.

With reference now to FIG. 3, a block diagram illustrates a data processing system in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (AN) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Incorporated. Instructions for the operating system, the object-oriented operating system, and applications or programs may be located on storage devices, such as hard disk drive 326, and they may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or student-generated data. The depicted example in FIG. 3 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

The present invention, foreign language teaching tool (hereinafter FLTT), is an apparatus which employs two processes: primary translation process 400 and secondary translation process 500. Primary translation process 400 occurs outside of e-book 600 and insures the correct translation of the original text. Secondary translation process 500 occurs inside e-book 600 and incorporates the translation preferences specified by the student, the original text, the translated text, and index files created by primary translation process to create the partially translated text.

Figures 4, 5:
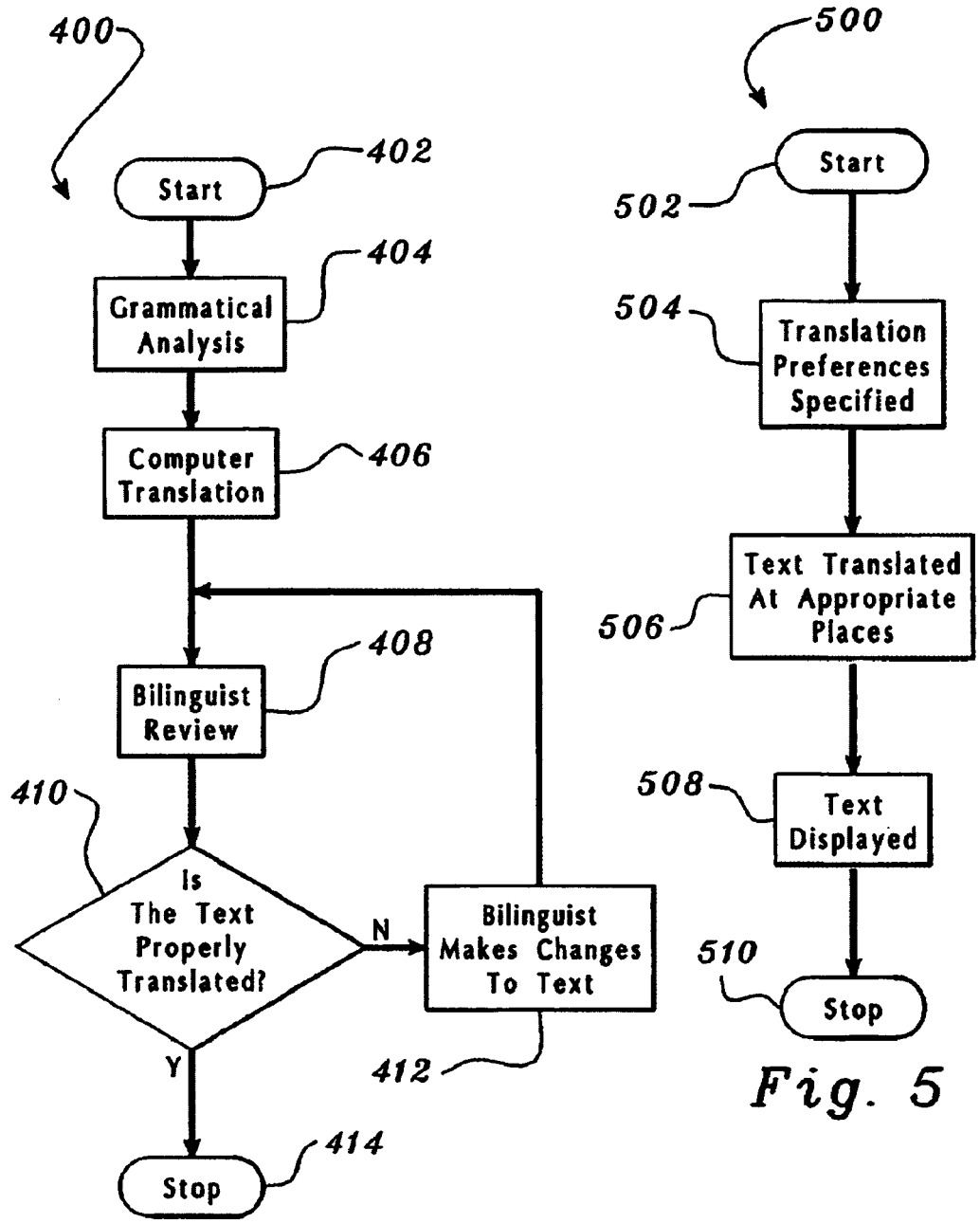
FIG. 4 is a flowsheet of the primary translation process.
FIG. 5 is a flowsheet of the secondary translation process.

FIG. 4 is a flowsheet of primary translation process 400. In primary translation process 400, the entire original text is translated from the native language to the foreign language.

Primary translation process 400 starts (402) and the original text is broken down into grammatical units (404). In the preferred embodiment, grammatical units include:
1. Nouns, both masculine and feminine
2. Verbs, including their various tenses
3. Adjectives
4. Adverbs
5. Objects, including both masculine and feminine and either direct, indirect, or of a preposition
6. Object modifiers
7. Prepositions
8. Pronouns, both masculine and feminine
9. Definite Articles, both masculine and feminine
10. Indefinite Articles, both masculine and feminine
11. Conjunctions
12. Contractions These grammatical units serve two functions. First, they allow the student to specify, in secondary translation process 500, the order, rate, and frequency of words that the student wishes to be translated. This concept is discussed more in conjunction with secondary translation process 500. Secondly, the grammatical units allow FLTT to properly convey the correct grammatical rules of the foreign language to the student, which may be very different from the grammatical rules of the student's native language.

Primary translation process 400 then uses a commercial translation software package to translate the entire original text from the native language to the foreign language (406). Commercial translation software packages use a foreign language-native language dictionary and numerous grammatical rules to translate the original text from the native language to the foreign language. Several commercial translation software packages are known in the art and one of ordinary skill in the art will know best which software package to select based on the foreign language, the native language, and the subject matter and type of original text. A bilingual translator who is fluent in literary terms of both the native language and the foreign language and is familiar with the original text then reviews the translated text for preservation of the literary essence of the original text. In other words, the bilingual translator will review the commercial translation software package's translation to ensure that the literary intent of the author of the original text is preserved. The bilingual translator then makes a determination whether the literary intent is intact (410). If the translated text is properly translated, then primary translation process 400 ends (414). If at step 410, the translated text is not properly translated, then the bilingual translator makes changes to the translated text which more accurately conveys the literary intent of the author of the original text (412) and primary translation process return to step 408.

Primary translation process 400 produces a number of different files. In addition to an electronic copy of the original text, primary translation process 400 produces the translated text and a correlation index of words and sentences between the original text and the translated text. For example, the correlation index shows that sentence 47 of the original text correlates to sentence 48 of the translated text and that word 427 of the original text correlates to word 463 of the translated text. Because the vocabulary and grammatical rules of the native language and the foreign language are different, the sentences and words in the two languages will not necessarily result in a one to one correlation. Moreover, primary translation process 400 will produce a grammatical unit index which is a list of the number, type, and location of the grammatical units for the original text and the translated text, which will be used by secondary translation process 500 to produce the partially translated text and to teach the student the rules of grammar of the foreign language.

Figures 6, 7:
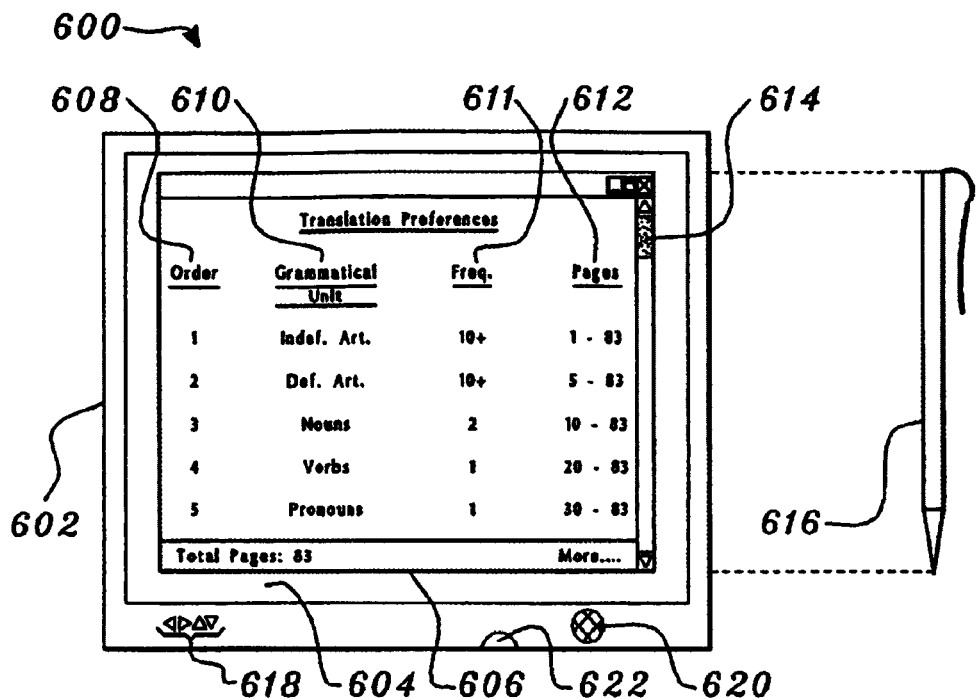
FIG. 6 is an illustration of the e-book displaying the preferences menu.
FIG. 7 is an example of how the same sentence would appear at different points throughout the partially translated text.

After primary translation process 400 is completed, secondary translation process 500 begins. However, before secondary translation process 500 begins, the correlation index, the grammar index, the original text, and the translated text are loaded on to e-book 600. Secondary translation process 500 is a computer software program operable on the computer contained within e-book 600. Secondary translation process 500 allows the student to select the translation order, rate, and frequency of the grammatical units. Secondary translation process 500 starts (502) and the student specifies the translation preferences (504). In specifying the translation process, the student makes a selection from menu 606 regarding the desired order, rate, and frequency of the grammatical unit translation (See FIG. 6). FIG. 6 shows selection menu 606 where the student can define the grammatical unit order 608, the grammatical unit type 610, and when (rate) 612 and how often (frequency) 611 the translated grammatical unit will appear. In specifying the order, of the grammatical units, the student ranks the grammatical units and determines which grammatical units will be introduced before and after the other grammatical units in the partially translated text. In the preferred embodiment, the order of the grammatical units is ranked ordinals. In specifying the rate of the grammatical units, the student determines when the specified grammatical unit shall be introduced into the partially translated text. The rate in the preferred embodiment is specified as the specific page range in which the student wishes the specific grammatical unit to appear. In specifying the frequency of the grammatical unit, the student specifies the number of translated occurrences of the specified grammatical unit shall appear in a given sentence, paragraph, or page. The frequency in the preferred embodiment is specified as the number of occurrences in a given paragraph and ranges between values of one to nine and also includes the value 10+ to indicate any frequency above 9. Alternatively, the student may select a "standard template" to establish a pre-defined translation order, rate, and frequency of grammatical units.

After the student has specified the preferences in step 504 of secondary translation process 500, secondary translation process 500 translates the original text according to the criteria specified in step 504 (506). Secondary translation process 500 uses the grammatical index, correlation index, original and translated texts to create the partially translated text. Secondary translation process 500 does this by using the grammatical unit preferences to decide which grammatical units will be translated at which points in the text. For example, if the grammatical unit preferences states that nouns and definite articles are to be translated from the native language to the foreign language in the first thirty pages of the original text, secondary translation process 500 uses the grammatical unit index, the correlation index, and the original text to translate the nouns and definite articles in the first thirty pages of the original text. This hybrid native language/foreign language is the partially translated text. FLTT then displays the partially translated text on screen 604 (508) and secondary translation process ends (510).

FIG. 6 is an illustration of e-book 600 incorporating FLTT. E-book 600 comprises housing 602, screen 604, menu 606, speaker 620, I/O port 622 and input devices such as stylus 616 or directional arrows 618. Screen 604 can display menu 606, original text (not shown), partially translated text (not shown), or translated text (not shown). The student can use scroll bar 614 to pan through menu 606. Different pages of the original text, the translated text, or the partially translated text can appear on screen 604. I/O port 622 is used for transmission of information to the Internet. I/O port 622 can be a USB (universal serial bus) port, an infrared port, a modem, a wireless connection, an electrical port, an optical port, or any port for data transmission port as determined by those skilled in the art. I/O port 622 is used for transmission of electronic copies of original text, translated text, grammatical unit index, and correlation index or other data to/from e-book 600 and the Internet. By using I/O port 622 on e-book 600, primary translation process 400 and secondary translation process 500 do not have to be performed by the same person or company and do not have to be performed at the same location or time.

FIG. 7 is an example of the partially translated text from step 508 of secondary translation process 500. In example 700, the sentence "the fat boy looked at a green book" is shown at various stages of translation from the native language of English to the foreign language of Spanish. The illustration in FIG. 7 is not from an original text, translated text, or a partially translated text, but example 700 is useful in illustrating the inventive concept behind the present invention. In example 700, lines 702 to 718 are illustrative of how the sentence "the fat boy looked at a green book" would appear at various different points throughout the partially translated text. Table 1 is a list of the specifications entered into e-book 600 by the student and table 2 shows where each sentence would appear given certain student specifications.

TABLE 1

Example of a possible Student Translation Specification

| Order | Grammatical Units to be Translated | Frequency | Pages |
|---|---|---|---|
| 1 | None | 10+ | 1–83 |
| 2 | Indefinite Articles | 10+ | 10–83 |
| 3 | Indefinite Articles and Definite Articles | 10+ | 20–83 |
| 4 | Indefinite Articles, Definite Articles, and Nouns | 9 | 30–83 |
| 5 | Indefinite Articles, Definite Articles, Nouns, and Adjectives | 7 | 40–83 |
| 6 | Indefinite Articles, Definite Articles, Nouns, Adjectives, and Verbs | 5 | 50–83 |
| 7 | Indefinite Articles, Definite Articles, Nouns, Adjectives, Verbs, and Prepositions | 3 | 60–83 |
| 8 | Indefinite Articles, Definite Articles, Nouns, Adjectives, Verbs, Prepositions, and Objects of Prepositions | 1 | 70–83 |
| 9 | All | 10+ | 80–83 |

TABLE 2

Examples of how the same sentence appears at various points through the partially translated text

| Sentence from FIG. 7 | Example of a Page in Partially Translated Text |
|---|---|
| 702 | 1 |
| 704 | 10 |

TABLE 2-continued

Examples of how the same sentence appears at various points through the partially translated text

| Sentence from FIG. 7 | Example of a Page in Partially Translated Text |
|---|---|
| 706 | 20 |
| 708 | 30 |
| 710 | 40 |
| 712 | 50 |
| 714 | 60 |
| 716 | 70 |
| 718 | 80 |

In line 702, the sentence appears completely in the native language. In line 704, the indefinite article "a" has been translated to "un". In line 706, the definite article "the" has been translated to "el". In line 708, the noun "boy" has been translated to "chico." In line 710, the adjective "fat" has been translated to "gordo." Additionally, in line 710, the student has been introduced to the correct grammatical construction of a noun and an adjective. In English the noun follows the adjective, but in Spanish, the noun precedes the adjective. Thus whenever the student is introduced to a foreign language noun and adjective combination, the foreign language teaching tool teaches the student the correct grammatical construction of the noun phrase. In line 712, the verb "looked" has been translated to "miró." In line 714, the preposition "at" has been translated to "a." In line 716, the object of the preposition "book" has been translated to "libro." In line 718, the adjective modifying the object of the preposition "green" has been translated to "verde." Similar to the grammatical construction in line 710, line 718 teaches the proper grammatical construction in the foreign language of using the noun before the adjective. In the preferred embodiment, FLTT correctly inverts the order of noun/adjective, verb/adverb, and object/modifier combinations from English to Spanish, but only after both words have been introduced in Spanish. In this manner, FLTT introduces the student to the vocabulary first and then the correct grammatical construction of the sentence.

In the preferred embodiment, the foreign words in the partially translated text are highlighted, either by using a different type face from the original text (i.e. Times New Roman, Courier, Ariel, etc.) or by changing the font of the existing type face (i.e. bold, underline, italics, highlights, or a different color). Furthermore, in the preferred embodiment, the foreign words contain a hyperlink to a dictionary which will show their meaning. This is very useful when the student cannot remember what the native language translation of a foreign word is. The hyperlink can also contain additional information about the word, such as commentary about the word or the context it is used in, different tenses or the infinitive form of the word if it is a verb, singular or plural forms of the word, indicate if the word is masculine or feminine, or a pronunciation of the word. For pronunciation, there are many software technologies known in the art that can vocalize computer text files, including the ViaVoice system by the International Business Machine Corporation of Armonk, N.Y. In e-book 600, this technology is present in the computer inside e-book 600 and the student has the option of either listening to the pronunciation of the requested word, or can have e-book 600 read the partially translated text, the original text, or the translated text to the student.

FIG. 8 is an example of a page of the original text. Specifically, FIG. 8 is the first two paragraphs of "Treasure Island" by Robert Louis Stevenson. Fine literary works such as "Treasure Island" contain several grammatical challenges and nuances which would be difficult for a conventional software translation package to translate, hence the need for the present invention. FIG. 9 is an example of a page of the partially translated text after undergoing primary translation process 400 and secondary translation process 500. FIG. 9 has been created by only translating the definite articles. In reading the partially translated text in FIG. 9, the student will initially be aware that the word "the" has been replaced with either "el" (masculine) or "la" (feminine), depending on the gender of the word. As the student progresses through the partially translated text, an increasing amount of the text will be converted from the native language to the foreign language as specified by the student in the grammatical unit preferences.

In the case of foreign languages which are not read in the same orientation as the native language, the present invention incorporates the foreign words in the correct orientation into the partially translated text. It may seem strange to the reader, but the translated words would be introduced in the languages read right-to-left or top-to-bottom in the same way as languages that are read left-to-right. The strangeness would occur because the Arabic (read right-to-left) reader would be reading words spelled right-to-left, and then encounter an English word or phrase which would be properly read left-to-right. The word or phrase would be in the correct position in the sentence, but simply spelled in the opposite direction.

In one alternative embodiment, the FLTT can be embodied in printed material instead of e-book 600. In the case of this alternative embodiment, a specific set of student preferences is selected and the partially translated text is produced according to primary translation process 400 and secondary translation process 500 as described in the preferred embodiment. The partially translated text is printed and bound and the student reads the partially translated text as a normal book or manuscript.

Another alternative embodiment of the present invention is to allow the student to create a first partially translated text from the native language to the foreign language and a second partially translated text from the foreign language to the native language. The correlation index is then printed and the student can reference the correlation index whenever he or she is unsure of the translation of a specific word, phrase or sentence. This embodiment is particularly useful when used in conjunction with the printed embodiment (as opposed to the preferred e-book embodiment) described above.

In another alternative embodiment of the present invention, the native words can be inserted after the foreign words in the partially translated text, or vice-versa. This embodiment can continue throughout the entire partially translated text, throughout a portion of the partially translated text, or only during the first few instances that a foreign word is used in the partially translated text. Another possible alternative embodiment is to control the introduction of the rate of different verb tenses or to include a familiar verb in its infinitive form either before or after or as a hyperlink to the foreign word in the partially translated text.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A translation-method to introduce a user to a plurality of translated words in partially translated text comprising:
   analyzing the grammar of an original language text;
   creating a grammatical unit index based on said analysis; and
   translating said original language text into a translated text;
   creating a correlation index showing a word-by-word and sentence-by sentence correlation of the original text and the translated text;
   using the grammatical unit index, the correlation index, the original language text and the translated text, creating the partially translated text containing the plurality of translated words;
   displaying the partially translated text so that the amount and frequency of the plurality of translated words is determined by a selection of an order, a rate, and a frequency;
   wherein the order is a ranking of grammatical units used to determine which grammatical units will be introduced before other grammatical units in a partially translated text;
   wherein the rate is a page range in which a specified grammatical unit will appear; and
   wherein the frequency is the number of translated occurrences of a specified grammatical unit selected to appear in a section of partially translated text.

2. The method of claim 1 further comprising the step of having a bilingual translator review the translated text and determine whether the translation of the translated text has retained an author's literary intent.

3. A computer implemented method for teaching a foreign language comprising:
   analyzing the grammar of a first text;
   creating a plurality of grammatical units based on said analysis of said first text;
   translating said first text to obtain a second text;
   accepting a specification containing information;
   utilizing said first text, said second text, and said information to create a third text; and
   displaying said third text;
   wherein the third text is a hybrid text containing a first language of the first text and a plurality of translated grammatical units translated into a second language;
   wherein an amount and a frequency of the plurality of translated grammatical units is determined by a user selection of an order, a rate, and a frequency.

4. The method of claim 3 further comprising the step of having a bilingual translator review the second text and make a determination whether the second text has retained the author's literary intent.

5. The method of claim 3 wherein said information further comprises a specific order for a grammatical unit; and wherein the order is a ranking of grammatical units used to determine which grammatical units will be introduced before other grammatical units in a partially translated text.

6. The method of claim 3 wherein said information further comprises a specific rate for a grammatical unit; and wherein the rate is a page range in which a specified grammatical unit will appear.

7. The method of claim 3 wherein said information further comprises a specific frequency for a grammatical unit; and wherein the frequency is the number of translated occurrences of a specified grammatical unit selected to appear in a section of partially translated text.

8. An apparatus for teaching a foreign language comprising:
   programmable hardware;
   software;
   said programmable hardware being directed by said software to perform steps comprising:
   analyzing the grammar of a first text;
   creating a plurality of grammatical units based on said analysis of said first text;
   translating said first text to obtain a second text;
   accepting a specification containing information;
   utilizing said first text, said second text, and said information to create a third text;
   displaying said third text;
   wherein the third text is a hybrid text containing a first language of the first text and plurality of translated grammatical units translated into a second language; and
   wherein an amount and a frequency of the plurality of translated grammatical units is determined by a user selection of an order, a rate and a frequency.

9. The apparatus of claim 8 wherein said programmable hardware is further directed by said software to perform steps further comprising the step of having a bilingual translator review the second text and determine whether the translation of the translated text has retained an author's literary intent.

10. The apparatus of claim 8 wherein said information further comprises a specific order for a grammatical unit and wherein the specific order is a ranking of grammatical units used to determine which grammatical units will be introduced before other grammatical units in a partially translated text.

11. The apparatus of claim 8 wherein said information further comprises a specific rate for a grammatical unit and wherein the specific rate is a page range in which a specified grammatical unit will appear.

12. The apparatus of claim 8 wherein said information further comprises a specific frequency for a grammatical unit and wherein the frequency is the number of translated occurrences of a specified grammatical unit selected to appear in a section of partially translated text.

13. A computer program product for teaching a foreign language comprising:
   means for analyzing the grammar of a first text;
   means for creating a plurality of grammatical units and a grammatical unit index based on an analysis of the first text;
   means for translating said first text to obtain a second text;
   means for accepting a specification containing information;
   means for utilizing said first text, said second text, and said information to create a third text;
   means for displaying said third text;
   wherein the third text is a hybrid text containing a first language of the first text and a plurality of translated grammatical units translated into a second language; and
   wherein an amount and a frequency of the plurality of translated grammatical units is determined by a user selection of an order, a rate and a frequency.

14. The apparatus of claim 13 further comprising means for having a bilingual translator review the second text and determine whether the translation of the translated text has retained an author's literary intent.

15. The apparatus of claim 13 wherein said information further comprises a specific order for a grammatical unit and wherein the specific order is a ranking of grammatical units used to determine which grammatical units will be introduced before other grammatical units in a partially translated text.

16. The apparatus of claim 13 wherein said information further comprises a specific rate for a grammatical unit and wherein the specific rate is a page range in which a specified grammatical unit will appear.

17. The apparatus of claim 13 wherein said information further comprises a specific frequency for a grammatical unit and wherein the frequency is the number of translated occurrences of a specified grammatical unit selected to appear in a section of partially translated text.

18. The computer implemented method of claim 3 wherein a grammatical unit is selected from a list consisting of: nouns, verbs, adjectives, adverbs, objects, object modifiers, prepositions, pronouns, definite articles, indefinite articles, conjunctions, and contractions.

19. The computer implemented method of claim 3 wherein the plurality of grammatical units allow a plurality of grammatical rules to be displayed to the user.

20. The computer implemented method of claim 3 wherein the third text is downloaded to and displayed in an e-book.

21. The computer implemented method of claim 3 wherein the plurality of grammatical units are highlighted.

22. The computer implemented method of claim 3 wherein the plurality of grammatical units contain a hyperlink to a dictionary.

23. The computer implemented method of claim 3 wherein the plurality of grammatical units contain commentary.

24. The computer implemented method of claim 3 wherein electronic copies of the first text, electronic copies of the second text, the grammatical unit index, the correlation index, and the partially translated text are downloaded to and displayed in an e-book.

25. The computer implemented method of claim 3 wherein the order, rate and frequency of the grammatical units may be selected at a menu.

* * * * *

UNITED STATES PATENT AND TRADEMARK OFFICE
CERTIFICATE OF CORRECTION

| | | |
|---|---|---|
| PATENT NO. | : 7,085,707 B2 | Page 1 of 1 |
| APPLICATION NO. | : 10/132401 | |
| DATED | : August 1, 2006 | |
| INVENTOR(S) | : Milner | |

It is certified that error appears in the above-identified patent and that said Letters Patent is hereby corrected as shown below:

Col.11, line 4: delete "translation-"

Col.11, line 8: delete "and"

Signed and Sealed this

Seventh Day of November, 2006

JON W. DUDAS
*Director of the United States Patent and Trademark Office*